(12) United States Patent
Venkatachalam et al.

(10) Patent No.: US 9,078,227 B2
(45) Date of Patent: Jul. 7, 2015

(54) LOCATION SUPPORT IN WIRELESS NETWORKS

(75) Inventors: Muthaiah Venkatachalam, Beaverton, OR (US); Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 12/046,699

(22) Filed: Mar. 12, 2008

(65) Prior Publication Data
US 2008/0311931 A1    Dec. 18, 2008

Related U.S. Application Data

(60) Provisional application No. 60/943,890, filed on Jun. 14, 2007.

(51) Int. Cl.
*H04W 64/00* (2009.01)
*H04W 8/12* (2009.01)

(52) U.S. Cl.
CPC ............... *H04W 64/00* (2013.01); *H04W 8/12* (2013.01)

(58) Field of Classification Search
USPC ............................................. 455/456.1, 411
See application file for complete search history.

(56) References Cited

U.S. PATENT DOCUMENTS

| | | | |
|---|---|---|---|
| 2002/0147023 A1* | 10/2002 | Sawada et al. | 455/456 |
| 2004/0023670 A1 | 2/2004 | Merheb | |
| 2004/0203893 A1* | 10/2004 | Kotzin | 455/456.1 |
| 2004/0203904 A1* | 10/2004 | Gwon et al. | 455/456.1 |
| 2004/0242238 A1* | 12/2004 | Wang et al. | 455/456.1 |
| 2006/0240841 A1* | 10/2006 | Bhattacharya | 455/456.1 |
| 2007/0054673 A1* | 3/2007 | Suryanarayana et al. | 455/456.1 |
| 2007/0270168 A1* | 11/2007 | Sheynblat | 455/456.6 |
| 2007/0298806 A1 | 12/2007 | Venkatachalam | |
| 2008/0045178 A1 | 2/2008 | Venkatachalam | |

OTHER PUBLICATIONS

Venkatachalam, Muthaiah, Location-Based Services in Wireless Broadband Networks, pending U.S. Appl. No. 11/648,178, filed Dec. 29, 2006.

Venkatachalam, Muthaiah et al., Determining Locations of Mobile Stations in Wireless Networks, pending U.S. Appl. No. 11/754,864, filed May 29, 2007.

* cited by examiner

*Primary Examiner* — Michael Faragalla
(74) *Attorney, Agent, or Firm* — Trop, Pruner & Hu, P.C.

(57) ABSTRACT

Various embodiments of the invention determine and/or enhance the location of a wireless mobile station in a WiMAX network, and provide that location to a requesting device. Some embodiments produce more that one determination of the location, using different sources for the information, and combine the different determinations to produce an enhanced version of the location.

6 Claims, 6 Drawing Sheets

LOCATION SUPPORT IN WIRELESS NETWORKS

This is non-provisional application corresponding to provisional application Ser. No. 60/934,890, file Jun. 14, 2007, and claims the priority of that filing date of all common subject matter.

BACKGROUND

WiMAX technology can greatly increase the capability of wireless networks over that of WiFi technology. However, providing location services has thus far been generally neglected in developing WiMAX standards. Determining the location of a mobile station may become increasingly important for such things as emergency services and navigational assistance.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
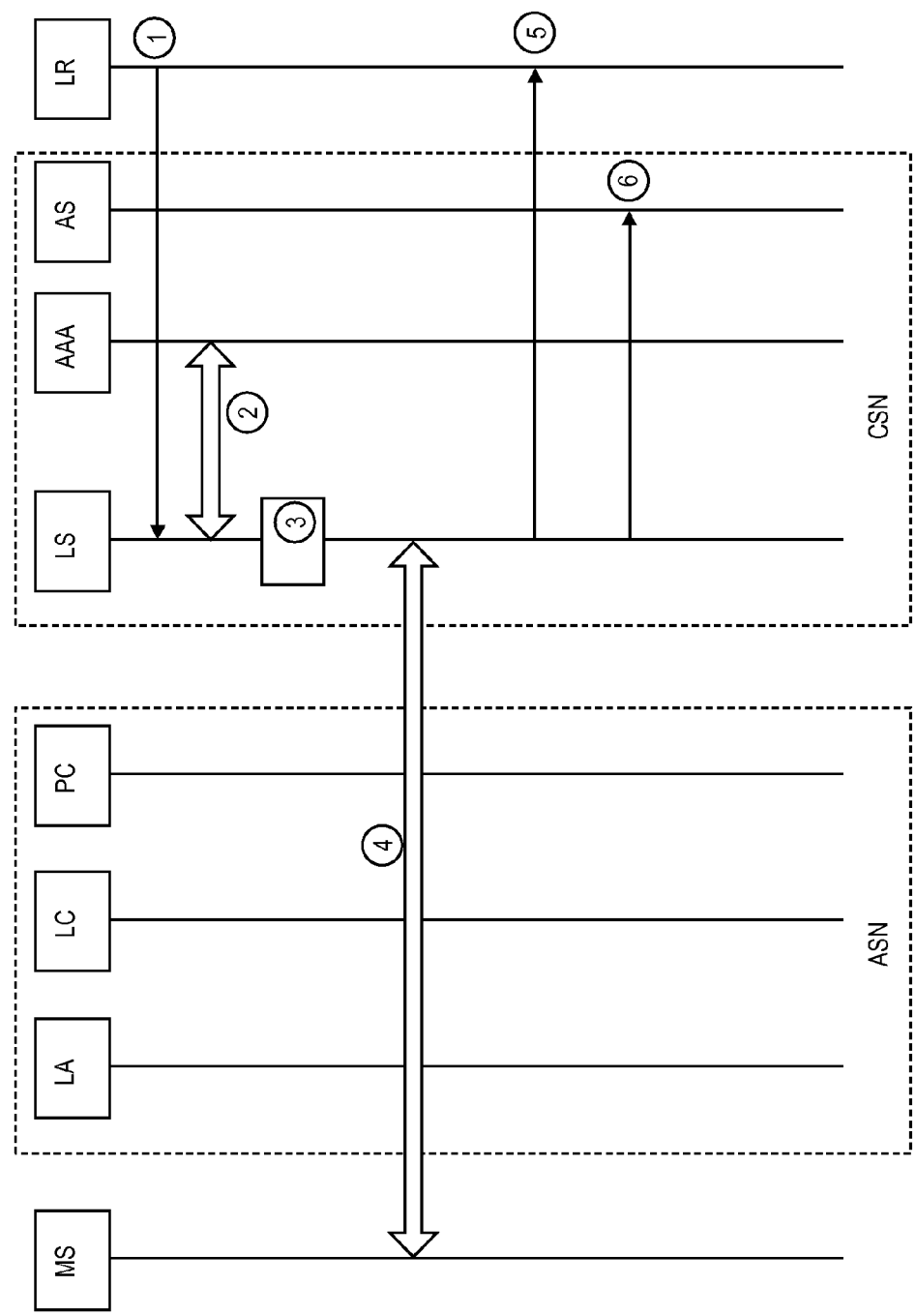
FIGS. 1-4 show various sequence diagrams of a series of communications to obtain a location of a mobile station, according to various embodiments of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by a machine (e.g., a computer). For example, a computer-readable medium may include a tangible storage medium, such as but not limited to read only memory (ROM); random access memory (RAM); magnetic disk storage media; optical storage media; a flash memory device, etc. A computer-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile" wireless device is used to describe a wireless device that may be in motion while it is communicating.

Various embodiments of the invention may use a process of communications among multiple wireless devices to obtain the location of a mobile station in a wireless communications network, such as, for example, a WiMAX network. In some embodiments, at least two sources of the location, derived in different devices, may be obtained and combined in some manner to enhance the accuracy of the location. Within the context of this document, a WiMAX device and/or network is a device and/or network that complies with the requirements of the Institute of Electrical and Electronic Engineers (IEEE) standard 802.16, in the latest version that was publicly available as of Jun. 1, 2007.

FIGS. 1-4 show various sequence diagrams of a series of communications to obtain a location of a mobile station, according to various embodiments of the invention. In each of these diagrams, the following conventions are used:

1) The sequence of events flows from top to bottom, with each communication or series of communications numbered in the order it occurs.

2) A unidirectional arrow indicates the primary information shown flows in a single direction, although there may be traffic in the other direction for various reasons (e.g., requesting permission to transmit, acknowledging a previous transmission, other information that is combined with the information shown, etc.)

3) A bidirectional arrow indicates the communication sequence may involve a two-directional exchange of multiple communications between the two devices.

4) A rectangular block indicates a task that must be performed to determine or obtain information. In some cases, it may involve a communications exchange between multiple devices.

DEFINITIONS

MS—Mobile station. Within this document, this is the device whose location is being sought.

LA—Location agent. A device that may sometimes be involved in determining the location of the MS. For example, the LA may provide timing information on when a signal from the MS was received. When combined with similar timing information from other devices, triangulation may be used to determine the location of the MS. In some embodiments, the base station that is controlling communications with the MS may be the LA.

LC—Location controller. The LC may control an operation to determine the location of the MS. For example, the LC may use timing data from multiple base stations to triangulate the location of the MS.

PC—Paging controller. When the MS is in idle mode, the PC may page the MS to get it out of idle mode so that the MS can take part in the location determination.

LS—Location server. This device may request location information on multiple MS's, and may make requests to various devices to obtain that information.

AAA—Authentication, Authorization, and Accounting server. This server can keep track of which devices have which capabilities and/or are authorized to access which services.

AS—Accounting server. A server that provides various accounting services related to communications (e.g., financial charges associated with the services used).

LR—Location requestor. The device that triggers the communications process by requesting the location of the MS. The LS could be any of various devices that need the location of the MS to perform various functions (e.g., an emergency service provider that needs to dispatch a medical team to the MS location).

ASN—Access Service Network. This is a network of devices that cooperate to provide communications access to the MS. In the illustrated embodiment, the ASN includes the LA, LC and PC.

CSN—Core Service Network. This is a network of devices that cooperate to provide various services to the MS and/or other devices. In the illustrated embodiments, the CSN includes the LS, AAA, and AS.

In some embodiments, the functionality represented by LA, LC, and PC may be in separate devices. In other embodiments, two or more of these functions may be combined into a single device. Similarly, in some embodiments the functionality represented by LS, AAA, an AS may be in separate devices, but in other embodiments two or more of these functions may be combined into a single device. In a preferred embodiment, these various functional entities may communicate wirelessly, but in other embodiments, some of the communications may be wired. When multiple functions are contained internally within a signal device, communication between those internal functions may, in some instances, be performed by simply accessing the same storage and/or memory locations.

FIG. 1 shows a sequence diagram of communications for determining a location of a mobile station from the mobile station's standalone location capability, according to an embodiment of the invention. 'Standalone' location capability indicates that the MS can determine its own location without getting its location information from other devices. For example, the MS may have a global positioning system (GPS), which computes its own position based on the timing of signals received from GPS satellites.

The communications sequence of FIG. 1 may be triggered when a communications device requests the location of the MS at step 1. The communications device may need this location information for any of various reasons. For example, the operator of the MS may have contacted an emergency services organization, which needs to determine the operator's location so that police or medical personnel may be dispatched to that location. The request from the LR may be directed at step 1 to the LS, a server that provides location services. Upon receiving this request, the LS may check with the AAA at step 2 to verify that the LR is authorized to request this information from the LS. In some embodiments, the AAA may also check to verify that the MS is authorized to provide this information to the LR.

At step 3 the LS may determine if the MS has standalone location capability. Standalone location capability means that the MS can determine its own location without depending on location information from other devices in the network. One example of standalone capability would be using global positioning satellite (GPS) signals to determine its own location. In some embodiments the information on whether the MS has standalone location capability may be stored in the LS, based on previous communications. In other embodiments the LS may need to seek this information by communicating with other devices (not shown). In some embodiments, if the MS does not have this capability, the request will be aborted and the LR notified. If the MS does have this capability, at step 4 the LS may perform a communications exchange with the MS to obtain the location from the MS, which has already determined its own location. At step 5 the location information derived by the MS may be passed on from the LS to the LR, which may then proceed to use that information. In some embodiments, accounting information about this transaction may also be passed to the AS at step 6 for billing or other purposes.

Figure 2:
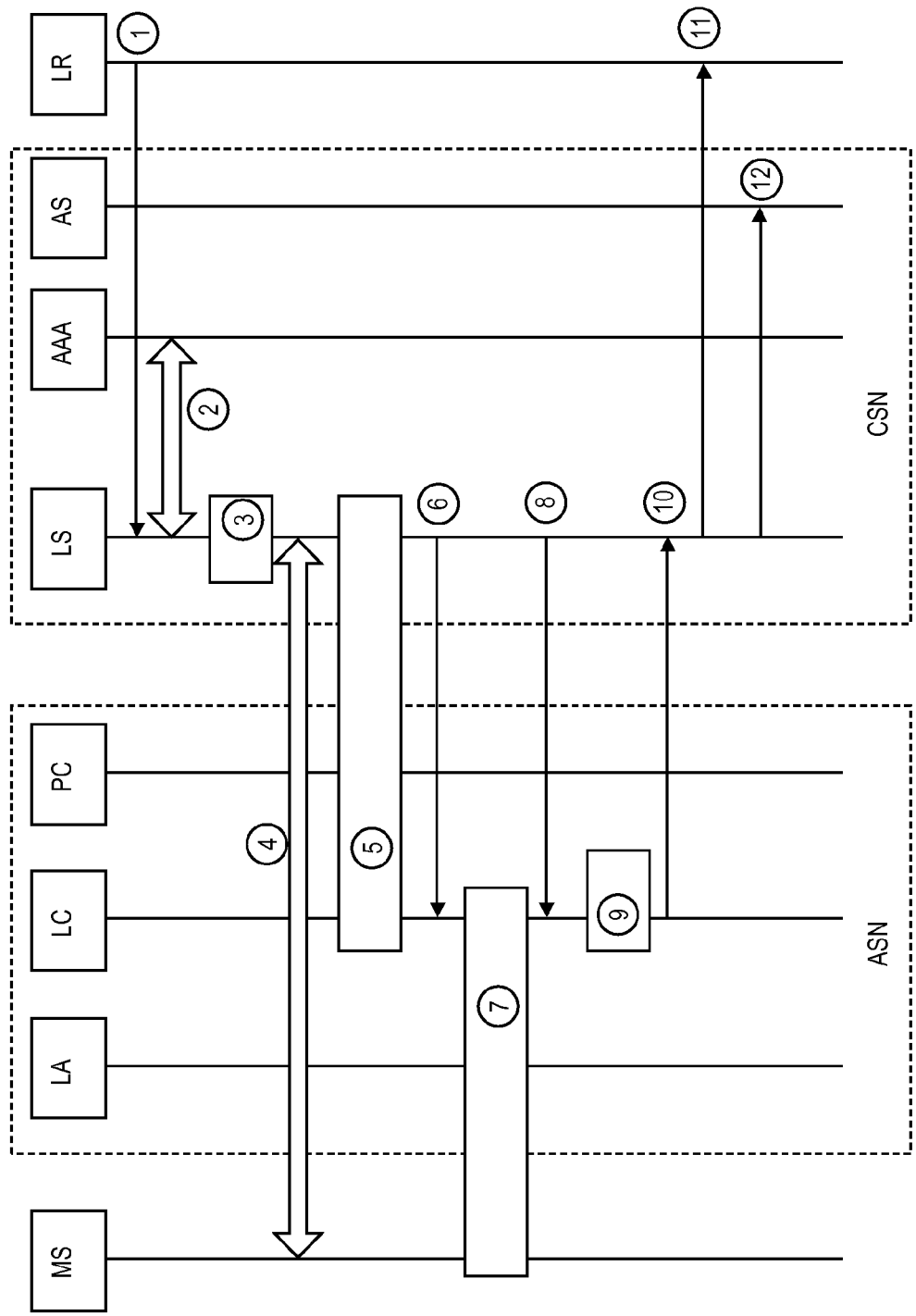

FIG. 2 shows a sequence diagram of communications for determining an enhanced location of a mobile station using a location controller for the enhancement process, according to an embodiment of the invention. In the illustrated embodiment, steps 1-4 correspond to steps 1-4 of FIG. 1. At step 5, the LS identifies the LC that is currently serving this particular MS, and at step 6 requests location information on this MS from the identified LC.

At step 7 the LC determines the location of the MS by using devices other than the MS to obtain that information. For example, the LC may initiate a process for determining the location, other than simply requesting the standalone information that the MS already has. In one embodiment, the LC may initiate a triangulation procedure in which multiple devices each obtain timing information on signals communicated to/from the MS. In some embodiments the LA is one of these devices. The LC may then use this information at step 7 in a triangulation calculation to determine the location of the MS. In some embodiments, the LC may use information that was indirectly derived from the MS (for example, using the reception time of signals transmitted from the MS) to derive the location of the MS, but this is not the same as simply using location information derived by the MS. Using two different independently derived sources of information may mitigate the effects of possible error from one source alone.

At step 8, the LS may provide to the LC the standalone location information the LS previously received at step 4. The LC now has location information on the MS from two different sources: the standalone information it received at step 8, and the calculated location that it determined at step 7. Since these two sources used different techniques to determine the location, each with its own elements of inaccuracy, they may indicate two slightly different locations.

At step 9 the LC can combine these two locations by applying a mathematical treatment to them to produce an enhanced location. In this document, the term 'enhanced location' indicates that the location has been determined by combining the location information from two or more sources in some manner. For example, the two readings may be averaged. In another example, a weighted average may be used to give preference to the reading that is expected to have the best accuracy. Other techniques of combining may also be used.

By combining multiple readings in this manner, the expected error of the enhanced location can be expected to be less than the expected error from either source by itself.

At step 10 the LC may provide the enhanced location information to the LS, and at step 11 the LS may provide the enhanced location information to the LR. In some embodiments, the LS may also provide accounting information to the AS at step 12 for billing purposes or for other uses.

Figure 3:
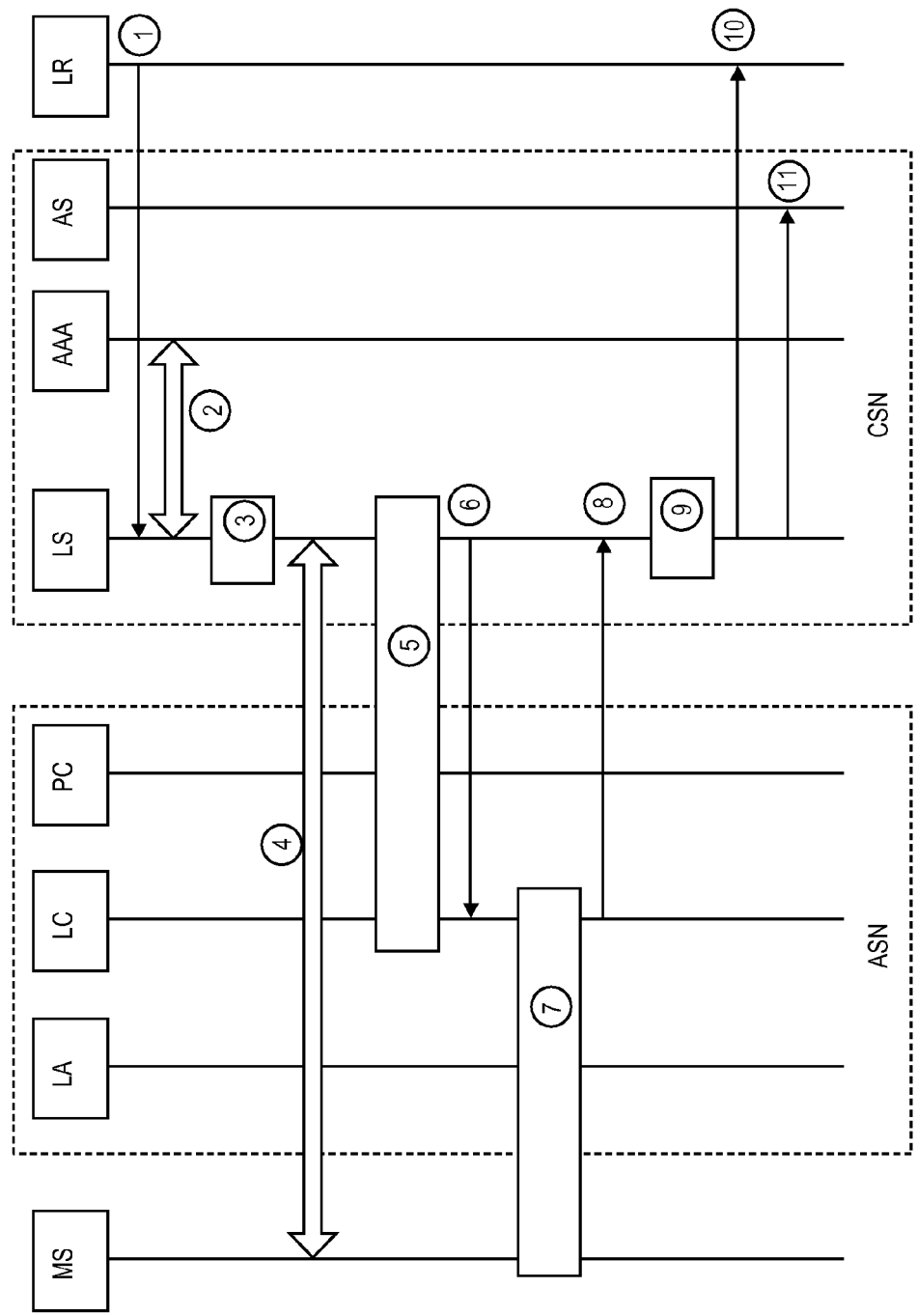

FIG. 3 shows a sequence diagram of communications for determining an enhanced location of a mobile station using a location server for the enhancement process, according to an embodiment of the invention. In the illustrated embodiment, steps 1-7 correspond to steps 1-7 of FIG. 2. At step 8 the LC sends to the LS the location information that was determined by the LC at step 7. At step 9 the LS determines an enhanced location by combining the location determined by the LC and the standalone location determined by the MS. At step 10 the LS forwards this enhanced location information to the LR. If needed, the LS may also forward information to the AS at step 11 for accounting purposes.

Figure 4:
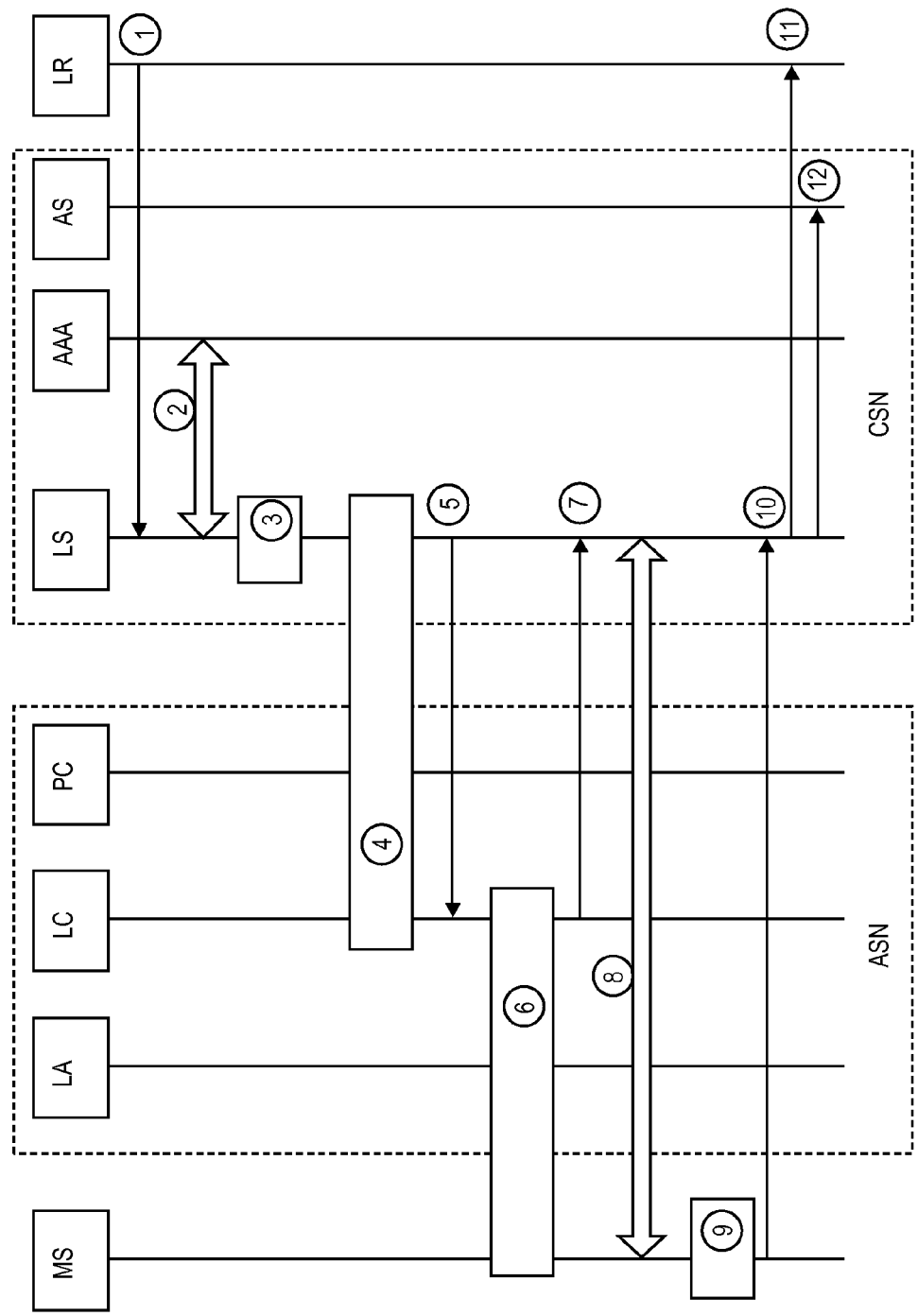

FIG. 4 shows a sequence diagram of communications for determining an enhanced location of a mobile station using the mobile station for the enhancement process, according to an embodiment of the invention. In the illustrated embodiment, steps 1-3 correspond to steps 1-3 of FIG. 2. At step 4, the LS may determine which LC is currently associated with the MS, and at step 5 send that LC a request for location information. At step 6 the LC may determine the location of the MS by using devices other than the MS to obtain that information, and report that location information back to the LS at step 7.

At step 8, the LS and MS may perform a series of communications with each other. The LS may request the MS to determine the location of the MS by using the standalone capability of the MS, and the LS may also send to the MS the location information that was previously determined by the LC at step 6. At step 9 the MS may determine an enhanced version of its location by combining the location information from these two sources. At step 10 the MS may forward this enhanced location information to the LS, which forwards that information to the LR at step 11. As before, in some embodiments the LS may also forward information to the AS at step 12 for accounting purposes.

Figure 5:
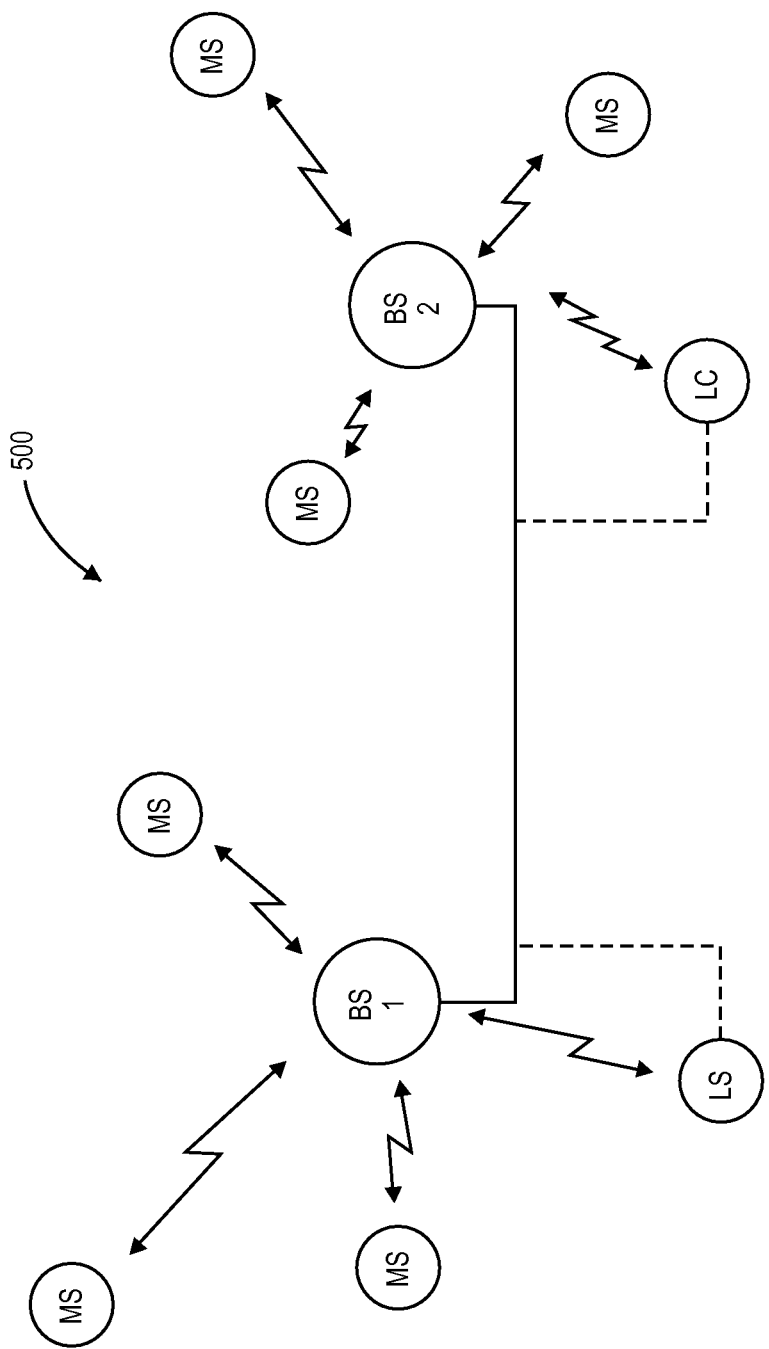
FIG. 5 shows a diagram of a network, according to an embodiment of the invention.

FIG. 5 shows a diagram of a network, according to an embodiment of the invention. In the illustrated network 500, various base stations (e.g., BS1, BS2) may each communicate wirelessly with various mobile stations (MS) in their coverage area. The base stations may also communicate with each other, so that devices being served by different base stations can communicate with each other through their respective base stations. The diagram shows BS1 and BS2 communicating over a wired link, but in some embodiments they may communicate with each other wirelessly.

In still other embodiments, BS1 and BS2 may communicate with each other through intervening devices (not shown) using wireless and/or wired links. A location server (LS) and a location controller (LC) are also shown. They too may communicate as needed through wireless and/or wired (per the dashed lines) links, using intervening devices if needed. A location requester may be any device that is requesting the location of one of the mobile stations. The location requester may be another mobile device, a base station, or a device not shown.

FIGS. 1-4 show two networks—an access service network (ASN) and a core service network (CSN)—that may be considered sub-networks within the network 500 of FIG. 5. The ASN and CSN networks may be defined by their functionality rather than by the types of devices used or the locations of those devices. In some cases, the different functional entities in these networks may simply be modules within a larger, more capable device.

Figure 6:
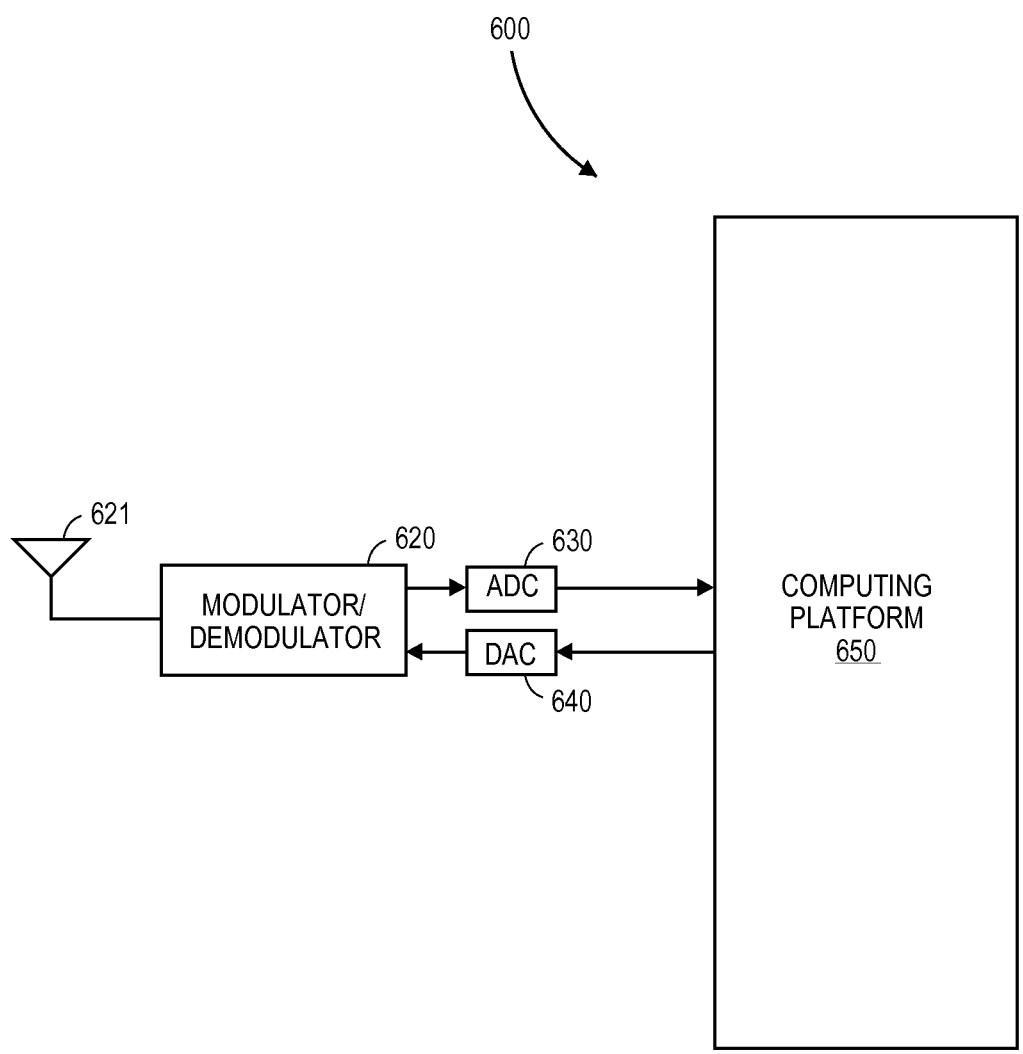
FIG. 6 shows a wireless communication device, according to an embodiment of the invention.

FIG. 6 shows a wireless communications device, according to an embodiment of the invention. The general overall description of wireless device 600 may be applied to a mobile station, a base station, or any other wireless communications device used in the illustrated wireless networks. Device 600 includes at least one computing platform 650 to perform data processing. Some embodiments may have multiple platforms devoting to different types of processing. For example, a digital signal processor may be used for processing digitized versions of analog signals, while a separate application processor may be used to perform particular applications such as data storage, power control, protocol formatting, etc.

A modulator/demodulator 620 may be used to convert baseband analog signals to radio frequency (RF) signals and to convert RF signals to baseband analog signals. An analog to digital converter (ADC 630) may be may be used to convert the baseband signals to digital signals for processing by the computing platform, and a digital to analog converter (DAC 640) may be used to convert digital signals from the computing platform to the baseband analog signals. Antenna 621 may provide the air interface that transmits outgoing RF signals and receives incoming RF signals. Some embodiments may include multiple antennas, each with its own modulator/demodulator, ADC, and DAC.

The forgoing description is intended to be illustrative and not limiting. Variations will occur to those of skill in the art. Those variations are intended to be included in the various embodiments of the invention, which are limited only by the spirit and scope of the following claims.

What is claimed is:

1. A method, comprising:
   receiving, in a location server in a core service network, said location server to provide location services to find a location of a wireless device, a request from a location requestor;
   checking using said location server, with an authentication, authorization and accounting server to verify that the location requestor is authorized to request the location;
   determining, in the location server, whether a wireless device has a location determining capability, and if so requesting location information from the wireless device;
   receiving, in the location server, a first indication of a location of a wireless device in a wireless network from the wireless device, said first indication based exclusively on information from the wireless device itself and not derived from other devices in the network;
   determining which of a plurality of location controllers in an access service network is the location controller for the wireless device whose location needs to be determined;
   receiving, in the location controller, a second indication of the location of the wireless device wherein the second indication is derived without using any location information from the wireless device itself, but instead is derived exclusively from other devices in the network;
   providing said first indication from said location server to said location controller;
   determining the location of said wireless device in said location controller by combining said first and second indications and sending the location to the location server; and sending the location from the location server to the location requestor.

2. The method of claim 1, further comprising:
providing the second indication from the location controller to a location server;
providing the second indication from the location server to the wireless device;
deriving the location, by the wireless device, from the first indication and the second indication; and
providing the location to the location server.

3. The method of claim 1, wherein the first indication is derived by using global positioning system techniques in the wireless device.

4. An article comprising:
one or more tangible machine-readable media that contain instructions, which when executed by one or more processors result in performing operations comprising:
receiving, in a location server in a core service network, said location server to provide location services to find a location of a wireless device, a request from a location requestor;
checking using said location server, with an authentication, authorization and accounting server to verify that the location requestor is authorized to request the location;
determining, in the location server, whether a wireless device has a location determining capability, and if so requesting location information from the wireless device;
receiving, in the location server, a first indication of a location of a wireless device in a wireless network from the wireless device, said first indication based exclusively on information from the wireless device itself and not derived from other devices in the network;
determining which of a plurality of location controllers in an access service network is the location controller for the wireless device whose location needs to be determined;
receiving, in the location controller, a second indication of the location of the wireless device wherein the second indication is derived without using any location information from the wireless device itself, but instead is derived exclusively from other devices in the network;
providing said first indication from said location server to said location controller;
determining the location of said wireless device in said location controller by combining said first and second indications and sending the location to the location server; and
sending the location from the location server to the location requestor.

5. The media of claim 4, wherein the operations further comprise:
providing the second indication from the location controller to a location server;
providing the second indication from the location server to the wireless device;
deriving the location, by the wireless device, from the first indication and the second indication; and
providing the location to the location server.

6. The media of claim 4, wherein the first indication is derived by using global positioning system techniques in the wireless device.

* * * * *